Aug. 7, 1962     R. P. NEWTON, JR     3,048,372
WASTE WATER HEAT RECLAIMER
Filed March 25, 1958     2 Sheets-Sheet 1
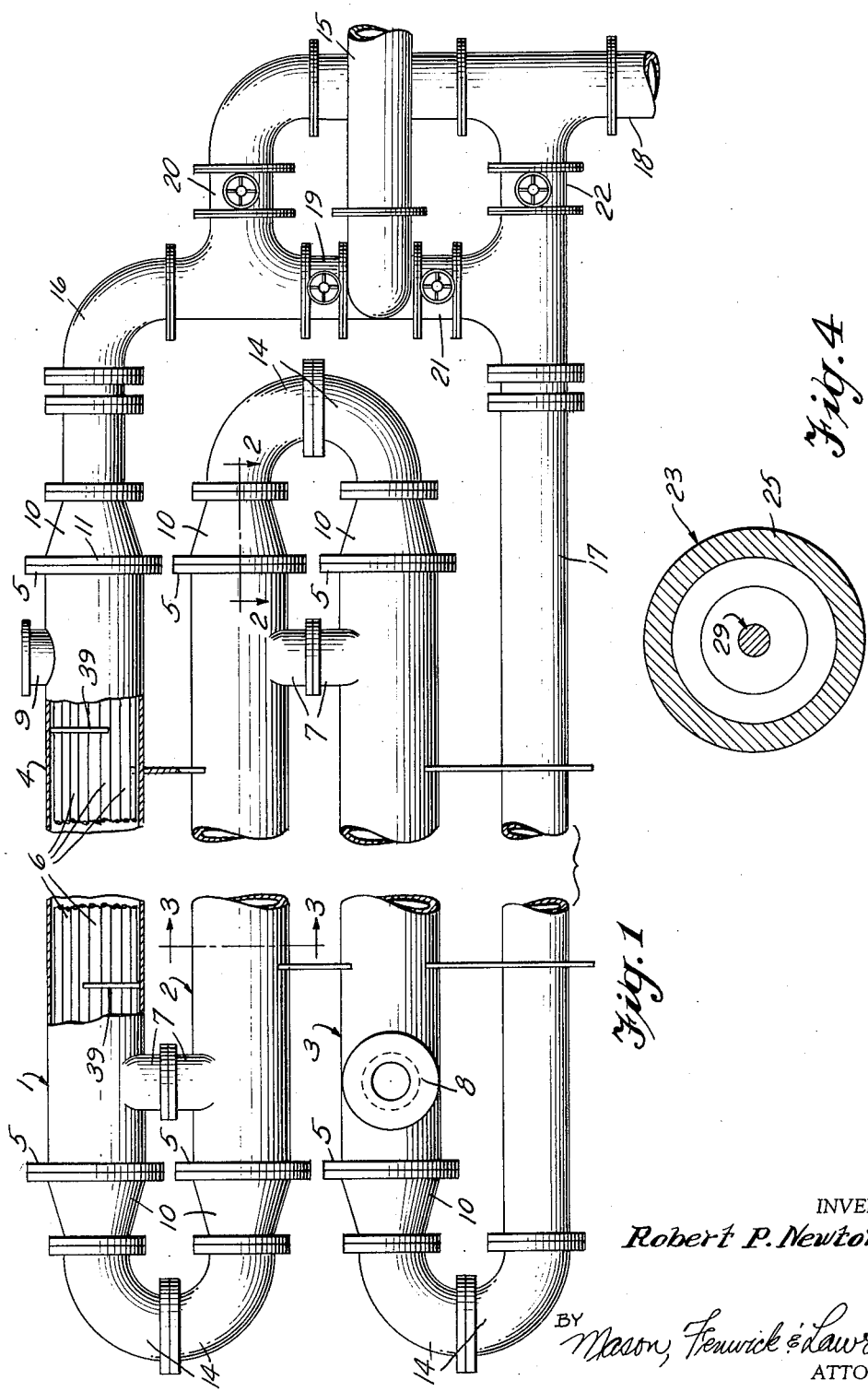
INVENTOR
Robert P. Newton, Jr.
BY Mason, Fenwick & Lawrence
ATTORNEYS Aug. 7, 1962   R. P. NEWTON, JR   3,048,372
WASTE WATER HEAT RECLAIMER
Filed March 25, 1958   2 Sheets-Sheet 2
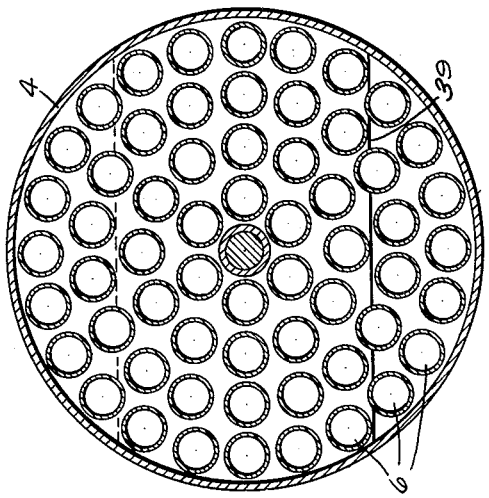
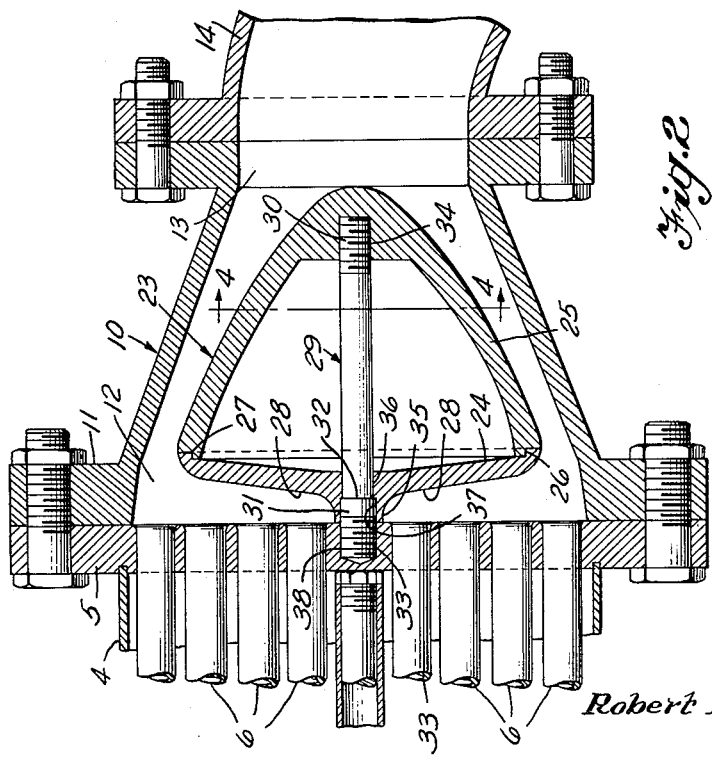
INVENTOR
Robert P. Newton, Jr.
BY Mason, Fenwick & Lawrence
ATTORNEYS

3,048,372
WASTE WATER HEAT RECLAIMER
Robert P. Newton, Jr., 1120 Moss Ave.,
Orangeburg, S.C.
Filed Mar. 25, 1958, Ser. No. 723,721
5 Claims. (Cl. 257—236)

This invention relates to heat exchange apparatus, and particularly to such apparatus adapted to use where one of the liquids to be handled may carry foreign matter.

In heat exchange apparatus for use in a laundry, a textile dyeing or finishing plant, or other processing system, foreign matter such as lint, or the like, is present in the processing liquid in such quantities that conventional heat exchanging equipment may soon clog and become inoperative. Clogging reduces efficiency, as high efficiency of heat transfer is obtained by maintaining high velocity flow. Efficiency is increased if the flow is constant. Constant flow also decreases the likelihood of foreign matter becoming arrested along the flow path with resultant clogging.

Systems which are non-clogging and have constant velocity have been proposed, such as that shown in U.S. patent to William M. Bready, No. 2,651,508, granted September 8, 1953. These, however, rely on continuity of tubing from one heat exchanging unit of the system to the next.

The object of the present invention is to provide heat exchanging apparatus wherein constant high velocity flow may be obtained throughout the system for maximum efficiency and to prevent clogging.

A more specific object is to provide such a system having means to retain constant high velocity flow through the units, and from one unit to the next, while using common connectors for the tube liquid from one unit to the next.

A further object is to provide an end connector for coupling heat exchanger units which maintains a cross-sectional flow passage equal to the total cross-sectional area of the tubes to provide for constant velocity flow.

Still another object is to provide a heat exchanger system in which the tubes of the individual units are arranged to provide maximum tube capacity in the bundle and uniformly dispersed flow into the unit connectors.

Yet another object is to provide in a heat exchange unit a tube bundle having a uniformly spaced tube pattern, which is impossible where individual tube connectors are used.

A still further object is to provide a heat exchanger having constant velocity at a cost lower than is possible with individual tube connectors.

Other objects of the invention will become apparent from the following description of one practical embodiment thereof when taken in conjunction with the drawings which accompany, and form part of, this specification.

In the drawings:

FIGURE 1 is a side view of a heat exchange system constructed in accordance with the present invention;

FIGURE 2 is a horizontal section, shown on an enlarged scale, taken on the line 2—2 of FIGURE 1;

FIGURE 3 is a vertical transverse section taken on the line 3—3 of FIGURE 1; and FIGURE 4 is a vertical transverse section through the liquid flow control vane, taken on the line 4—4 of FIGURE 2.

In general, the invention concerns a heat exchanging system wherein a plurality of exchanger units are serially connected together and to intake and outlet lines, or a single exchanger unit is connected to intake and outlet lines, with the connectors between the various elements of the system having the same, or essentially the same, cross-sectional flow capacity as the aggregate of the tubes making up the tube bundle in each exchanger unit, to maintain essentially constant flow velocity through the tubes and connectors. While the object is to so select and assemble the several parts of the system as to obtain uniformity of cross-section and uniformity of flow and velocity, it is recognized that this is not always possible with standard pipe and tube sizes. Any variation, however, is inconsequential, and the cross-section, flow and velocity are essentially uniform. In case of variation, the cross-section of the connectors should always be less than the aggregate of the tubes.

Referring to the drawings, in detail, there is shown a system including heat exchanging units 1, 2 and 3, each of which consists of an elongated shell 4 with tube sheets 5 at its ends, through which a plurality of liquid tubes 6 extend and to which they have their ends connected. The tube ends may be secured in any desired manner, and are shown as extending through openings in the sheets and flared in the usual manner. The tube sheets also form the connecting flanges for the shells.

The shells of the unit are interconnected by couplers 7 which open to the inside of the shells and permit flow of the liquid to be heated within the shells and around the tubes 6. An inlet coupler 8 is provided on the shell of the unit 3, and an outlet coupler 9 on the unit 1. The inlet and outlet, respectively, are to be connected to a source of water to be heated and the mechanism, or process equipment, with which hot water is to be used.

Each exchanger unit has an end member 10, which is really a reducer, coupled to each end. The reducers have flanges 11 by which they are bolted to the flanges of the units. The end members are frusto-conical in shape and have an inside diameter at the large end 12 equal to the inside diameter of the shell 4. At the opposite, or small end, the opening area 13 is substantially equal to the combined areas of the tubes within the shell. The end of the units are connected by two elbows 14 or by return bends, to provide for serial flow through the units. The elbows will be of the same cross-sectional area as the small outer ends of the reducers. The ends of the top and bottom units will be connected to an inlet pipe 15 by means of pipe lines 16 and 17 and to a drain line 18 by continuations of the same lines. Valves 19 and 20 in the pipe line 16 govern flow between that line and the inlet and drain lines, respectively, and valves 21 and 22 in the pipe line 17 govern flow between that line and the inlet and drain lines.

In order to provide for uniform, or substantially uniform, flow through the reducers, so that the transition from the tube bundle to the elbows or several pipe lines, or in the reverse direction, will be without appreciable velocity change, the reducers are provided with centrally positioned vanes 23. The vanes are so shaped and sized that at any vertical cross-section through the reducer the vane will occlude enough of the cross-sectional area of the reducer to leave a peripheral passage for fluid equal to the combined cross-sectional area of the tubes making up the tube bundle. In other words, the open area of the tapered reducer is maintained at constant capacity throughout its length through the use of the vane.

The vane shown is generally conical in shape, and consists of a base 24 and a cap 25 seated on the base. Both are circular in cross-section, and the base has an annular seat 26 into which the stepped bottom edge 27 of the cap fits. The base has its walls 28 inclined to provide for smooth direction change of the fluid flowing from the tubes. It also provides for the increased capacity needed adjacent the periphery, due to the greater number of tubes opening to the reducer in that area.

The two sections of the vane are held together, and the vane fixed in place, by means of a stud 29. The stud is an elongated rod having threads 30 on one end and a section 31 of enlarged diameter at the other end. A shoulder 32 is formed at the juncture of the enlarged section with the smaller section of the rod. The enlarged section is also threaded, as at 33. The hollow cap portion of the vane is drilled and tapped near the apex on its central axis, as at 34, and the base is provided with a central boss 35, which is also drilled to provide a through opening 36 to receive the stud. This opening is enlarged by a countersink 37 to seat the enlarged end of the stud. With this construction, the cap is seated on the base and the small end of the stud inserted through the opening 36 in the base and threaded into the opening 34. The shoulder 32 will seat against the bottom of the countersink 37 and the base and cap can be drawn into tight engagement with one another. The threaded end 33 of the stud will be left projecting from the end of the vane for insertion into a threaded opening 38, centrally of the tube sheet 5, to affix the vane in position on the unit.

It will be noted from FIGURE 3 that the tubes 6 are arranged within the shell in a plurality of concentric circles. This is done to achieve several purposes; it provides for more tubes in a given area than the conventional "rectangular" arrangement, and it provides for uniformity of flow from the entire tube area, so that there are no closed areas at the tube sheet for the accumulation of lint, or other foreign matter, irrespective of whether the flow is from the tubes into a reducer or from a reducer into the tubes.

It will be apparent that the shells of the units may contain any suitable arrangement of baffles 39 to control the flow path of the fluid to be heated so that proper velocity for maximum heat transferral between the tubes and fluid will be had.

In operating the device, the inlet 8 is connected to a supply of fresh fluid to be heated and the outlet 9 to whatever equipment is to be supplied with heated fluid. Pipe 15 is connected to a supply of hot fluid which has been used, and pipe 18 to a drain. With valves 19 and 22 open and valves 20 and 21 closed, hot fluid will enter from pipe line 15 through line 16 to the tubes of top unit 1 and flow through the tube bundles of units 2 and 3 and pipe 18 to a drain. Thus, the normal flow of the fluids through the tubes and the shells will be counter to one another and the fluid flowing through the shells will pick up heat from the tubes. It is desirable at times to back flush the tube lines, and this can be accomplished by closing valves 19 and 22 and opening valves 20 and 21. Back flushing will remove any lint or foreign matter that might collect in the exchanger.

It will be obvious that the use of pipes inter-connecting the several units which have a cross-section equal to the combined cross-sections of the tubes making up a tube bundle, and reducers tapering from the diameter of the shells to the diameter of the connecting pipes with means within the reducers to maintain a similar cross-section throughout, a system is obtained which has uniform flow capacity throughout so that essentially constant velocity is assured. The arrangement of the vane centrally of the reducer provides for equal flow in all directions to, and through, an annular passageway so as to control the fluid flow through the reducer without turbulence or interference with the fluid velocity. Thus, transferral of fluid from a plurality of small conduits to a single conduit having the combined capacity of the small ones can be effected without change in the fluid velocity rate.

While in the above one practical embodiment of the invention has been disclosed, it will be understood that the precise details of structure shown and described are merely by way of example and the invention may take other forms within the scope of the appended claims.

What is claimed is:

1. In heat exchange apparatus, a cylindrical shell, a tube sheet at each end of the shell closing the ends, a tube bundle within the shell with the tubes of the bundle opening through and anchored in said tube sheets, a pipe line for connection to each end of the shell having a cross-sectional area substantially equal to the cross-sectional area of the tube bundle, tapered reducer conduit means having opposite ends which match the cross-section of said shell and said pipe lines respectively for coupling each of said pipe lines to said shell, and means positioned within each tapered reducer conduit means, so shaped and proportioned as to convert the tapered passageway through the reducer to a single unobstructed annular passageway of cross-sectional area substantially equal to the cross-sectional area of the tube bundle and substantially equal to the cross-sectional area of the pipe at all points therealong.

2. In heat exchange apparatus as claimed in claim 1, said means positioned within the tapered reducer conduit means being a member of general conical shape provided with a boss centrally of its base to space the base from the heat exchanger and away from the ends of the tubes of the tube bundle, a stud projecting centrally from the boss of each conical shaped member, and said tube sheets having openings centrally thereof to receive the studs to fix the conical shaped members in position.

3. A reducer for interposition between a heat exchanger unit including a shell and a tube bundle within the shell and a pipe member having a cross-sectional area equal to the combined cross-sectional area of the tubes of the bundle comprising, a tapered tubular member having an end of large cross-section for connection to a heat exchanger shell and an end of smaller cross-section for connection to a pipe member, and a vane means mounted centrally of the reducer and concentric thereto so shaped and proportioned as to convert the tapered passageway through the tubular member to a single unobstructed annular passageway of cross-sectional area substantially equal to the cross-sectional area of the tube bundle and substantially equal to the cross-sectional area of the pipe at all points therealong.

4. A reducer as claimed in claim 3 wherein the vane means is of general conical shape and is provided with a boss centrally of its base for attachment to the heat exchanger and to space the base of the vane means from the heat exchanger and away from the ends of the tubes of the tube bundle.

5. A reducer as claimed in claim 3 wherein the vane means has a circular base carrying said boss and a conical cap seatable on the base, and a stud projecting through the base and into threaded engagement with the cap to lock the cap and base together, and the stud has a threaded end extending beyond the base for attaching the vane means to the heat exchanger.

References Cited in the file of this patent

UNITED STATES PATENTS

| | | |
|---|---|---|
| 514,935 | Kersenbrock | Feb. 20, 1894 |
| 673,767 | Eycleshymer | May 7, 1901 |
| 875,362 | Manny | Dec. 31, 1907 |
| 1,905,733 | Moore | Apr. 25, 1933 |
| 2,258,017 | King | Oct. 7, 1941 |
| 2,343,560 | Klein et al. | Mar. 7, 1944 |
| 2,553,361 | Crawford | May 15, 1951 |
| 2,651,508 | Bready | Sept. 8, 1953 |
| 2,772,076 | Matthews | Nov. 27, 1956 |
| 2,811,336 | Bready | Oct. 29, 1957 |

FOREIGN PATENTS

| | | |
|---|---|---|
| 433,343 | Great Britain | Aug. 13, 1935 |